July 3, 1928.  1,675,538

T. L. FAWICK

TRANSMISSION

Filed Dec. 11, 1925   3 Sheets-Sheet 1

Witness:
Geo. E. Down

Inventor
Thomas L. Fawick
By Brown, Boettcher & Dienner
Attys

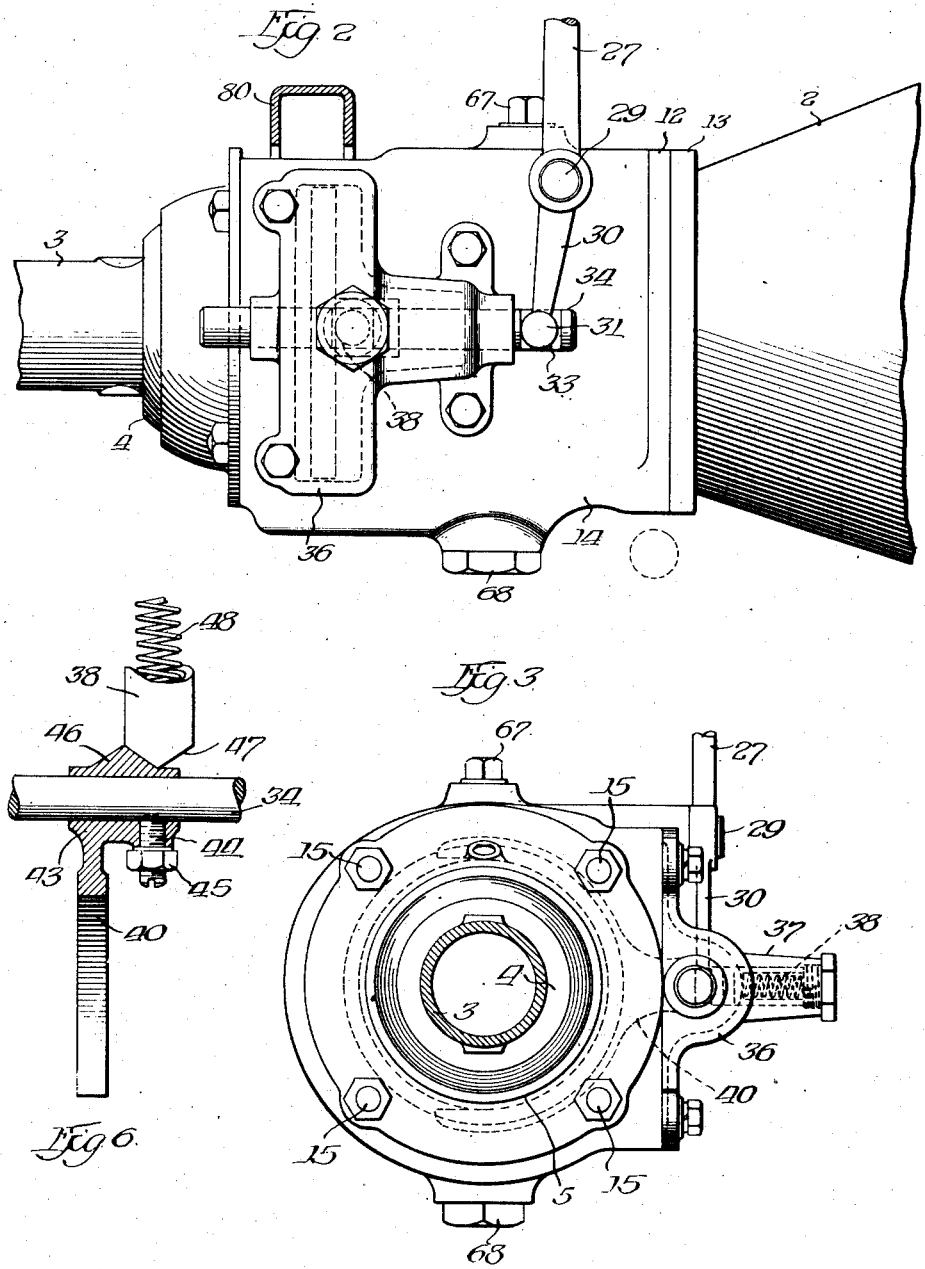

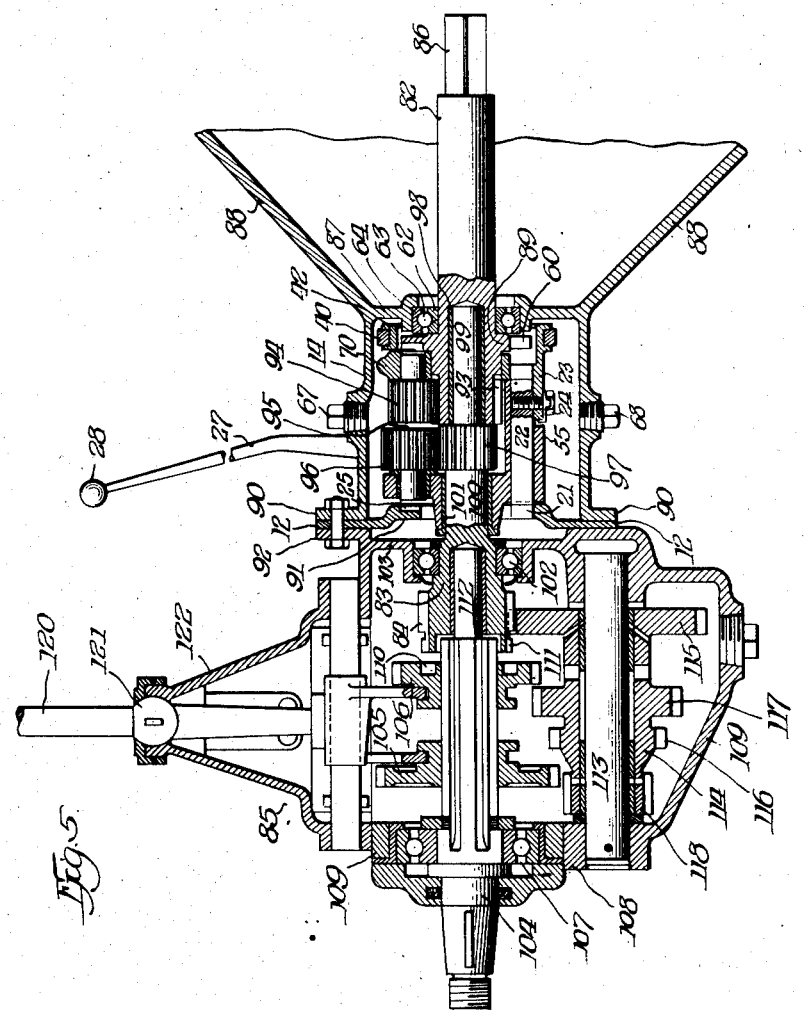

Patented July 3, 1928.

1,675,538

UNITED STATES PATENT OFFICE.

THOMAS L. FAWICK, OF RACINE, WISCONSIN.

TRANSMISSION.

Application filed December 11, 1925. Serial No. 74,813.

The present invention relates to a novel transmission to be used preferably, but not necessarily, in series with known, accelerating and reverse transmissions to provide a change of driving ratio between the engine and the rear axle. This may be to secure either the so called "under drive" or "over drive". The "under drive" is employed generally to give greater pulling power, as for example, in a truck or bus.

The principle of the so called "over drive" is well known. It has appeared in various forms, the most common being a change of gear ratio at the rear axle. Another form is an extra set of gears known as step-up gears in the usual transmission. The purpose, namely, economy and smoother engine operation, is also well known.

Gears of known type on the rear axle are out of the question, primarily because of their weight and remoteness from the point of control. The usual step-up gears in the transmission are noisy and inefficient and may take up too much room.

I provide, in accordance with the present invention, a set of gears of small diameter and of great strength for changing the drive ratio from engine to rear axle. The gears are in constant mesh and run very quietly. They may be made with teeth slightly inclined to give a herring bone effect to secure even greater quietness and strength. In the preferred embodiment, the transmission of my invention is placed in series with the usual accelerating and reverse transmission either behind the same or in front of it. While I have shown a specific form in which the ratio between engine and rear axle speeds is increased for an under drive, it is to be understood that instead I may decrease the ratio to give the over drive effect.

According to my invention, I provide at the ends of a pair of shaft sections, which are placed axially in line with each other, a pair of pinions of different diameters. About these pinions I dispose a cage and in the cage mount preferably three lay shafts having pinions of different effective diameters to cooperate with the pinions on the adjacent shaft sections, which shaft sections are driving and driven shaft sections, respectively. This cage with its lay shaft and pinions is then clutched to the driving shaft section (or the driven shaft section, as the case may be), for one position of transmission and it is clutched to a stationary support for another driving position. Naturally, between these two driving positions there is a neutral position but I do not, in the present embodiment, make any particular use of the same.

Due to the aforesaid construction, the two shafts may be piloted in each other. Due to the use of three or more lay shafts and pinions, the load is balanced and great strength is secured from even relatively narrow faced pinions. By varying the effective diameters of these gears any selected driving ratio within limits may be secured.

The resulting structure is simple, economical in manufacture and occupies little space. There is an advantage in interposing the transmission of my invention between the engine shaft and the usual transmission in that, by so doing, the device of my invention may be reduced in size since it does not need to carry the very heavy torque resulting from drive through a large gear reduction.

Now, in order to acquaint those skilled in the art with the manner of constructing and operating a device in accordance with my invention, I shall describe, in connection with the accompanying drawings, a specific embodiment of the same.

In the drawings,

Fig. 2 is a rear elevation view of the same;

Fig. 3 is a rear end view of the same;

Figure 7:
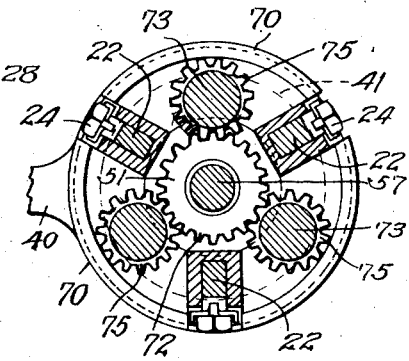
Figure 1:
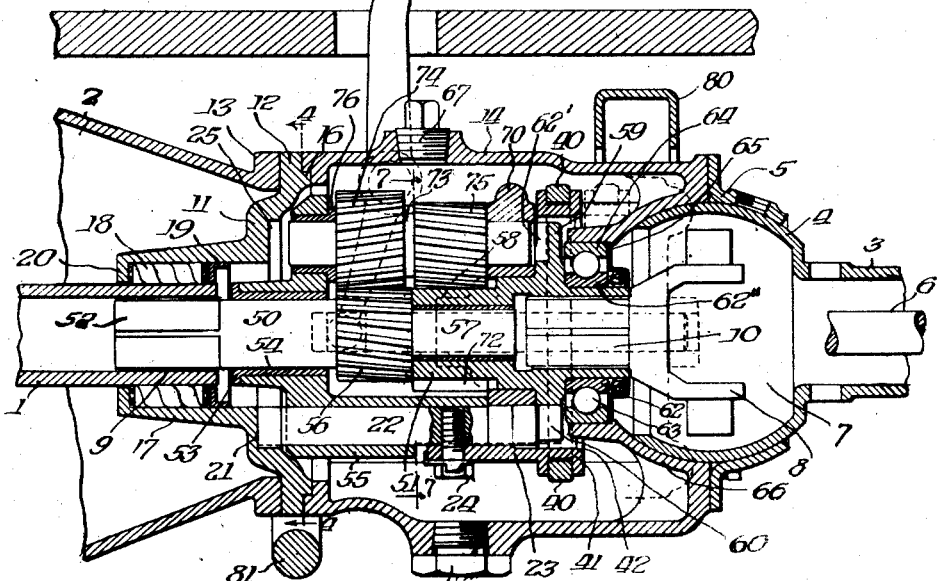
Figure 1 is a longitudinal vertical section of a device embodying my invention and shown as connected between a final drive shaft of the usual Ford transmission and the forward end of the propeller shaft of the usual Ford automobile.

Fig. 5 is a longitudinal vertical section of a modification in which the transmision of my invention is connected between the engine shaft and the usual sliding gear transmission, Fig. 6 is a fragmentary section through the shifter fork and connected parts, and Fig. 7 is a fragmentary cross sectional view through the cage taken on line 27 of Fig. 1 showing the location of the three lay shafts and the three clutch bars.

Referring now to Figure 1, the shaft 1, which is a hollow shaft, is the final drive shaft of the usual Ford accelerating and reverse planetary transmission, which is housed in the housing 2 and which I have not shown for the sake of clearness, the construction of the Ford transmission being well known to those skilled in the art.

The forward end of the short tube 3 of the usual Ford construction terminates in a spherical casing 4 which together with the retaining ring 5 and propeller shaft 6 are all parts of the Ford engine as now constructed. The propeller shaft 6 is connected to a universal joint 7, one element 8 being shown and another element which is connected to the propeller shaft 6 being omitted for the sake of clearness. The hollow engine shaft 1 has a squared socket 9 which normally receives the forward squared stud 10 of the universal joint part member 8, said member 8 with its stud 10 being part of the original Ford equipment.

Figure 4:
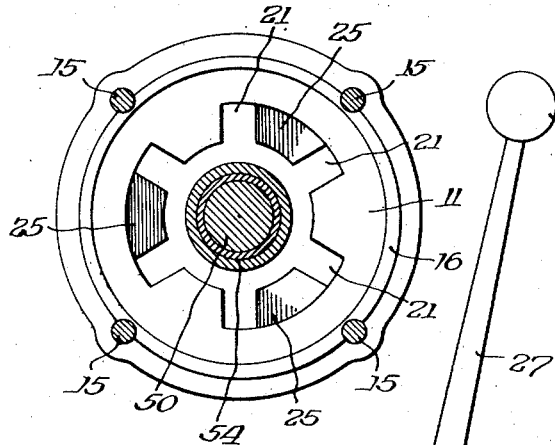
Fig. 4 is a section taken on the line 4—4 of Figure 1.

I provide at 11 a bearing and clutch member having a flange 12 which fits with the flange 13 on the Ford transmission housing 2 and which also meshes with the end of the gear case housing 14 of my invention. As shown in Figures 3 and 4, the retaining ring 5, the housing 14, and the flange 12 are all secured to the flange 13 of the Ford housing 2 by four longitudinal bolts 15 which fit in suitable lugs in the flange 13.

The housing 14 has its forward end piloted on a shoulder 16 formed on the flange 12 of the clutch and bearing member 11. The clutch and bearing member 11 has a forward tubular extension 17 in which is received the Hyatt roller bearings 18, the end of said tubular extension being flanged inwardly as indicated at 20 to retain the bearings 18 and a retaining ring 19 being seated in the inside of the tubular extension 17 as indicated at 19.

The member 11 has a series, preferably six recesses 21 which form clutch sockets for receiving the ends of a series of three clutch bars 22 which are connected to a shiftable cage or ring 23 by suitable screws 24, as shown in Figure 1. The cage 23 comprises the ring portion 40 and fingers extending therefrom connected to the individual bars 22.

Now, the clutch socket 21 extends far enough to receive the clutch bars 22 and in fact they may be milled or cut quite through the wall of the member 11, so as to provide sufficiently large bearings or shoulders for engaging said bars. Between the clutch socket 21 the metal of the body 11 is left standing the full thickness of the plate or body with the exception of alternate clutch portions indicated at 25, (see Figures 1 and 4), where the intervening metal is cut down to substantially half the depth of the clutch socket in order to assist the clutch bars 22 in proceeding into the socket 21, as will be explained more in detail later. The operating lever 27 having a knob 28 at the upper end is pivoted on a horizontal shaft 29, which shaft is mounted on a casing 14. Below the pivot 29 there is the arm 30 which has a rounded extension 31 lying in a notch 33 in the shifting plunger 34. This shifting plunger is guided in a cage or supplemental housing 36 bolted onto the side of the main housing 14. This supplemental housing has a guide 37 for a spring plunger, shown in dotted lines at 38, which is urged into engagement with the sides of the plunger 34 to secure a snap action. The plunger or shifter rod 34 bears a shifter fork 40, as shown in Figure 6. This shifter fork 40 embraces a groove 41 formed in a ring-like portion 42 of the shifter frame 23. The fork 40 has an integral hub 43 secured by suitable set screw 44 and lock nut 45 to the plunger or shifter rod 34. The hub member 43 has an integral hump or cam 46 which is adapted to be engaged by a corresponding wedge or cam-shaped end 47 of the spring plunger 38.

Between the driving shaft 1 and the driven shaft member 10, I provide two sections 50 and 51 which, in Figure 1, are continuations or sections of the driving shaft and driven shaft, respectively. The member 50 has a squared stud 52 fitting into the squared socket 9, previously described, and it has a round cylindrical bearing portion back of the stud 52 which fits in a bearing sleeve 53 formed in a suitable bearing portion 54 of the pinion and clutch cage 55. Back of the bearing portion, the shaft section 50 has an integral pinion 56. Back of the pinion, there is a reduced portion or stud 57, which is piloted into a bearing portion 58 formed in the driven shaft section 51. A suitable bearing liner embraces said bearing stud 57. Back of the bearing portion 58, there is a clutch flange 59 which preferably has six notches 60 formed like the notches 21 in the member 11. Alternate solid portions between notches being cut down or reduced in thickness, as indicated at 62' in Figure 1.

Back of said clutch flange 59 is the driven shaft section 51 which has a reduced portion having an internal squared socket 62'' for receiving the squared stud end of the universal joint member 8 and upon the outside of the same there is mounted the inner ring 62 of the ball bearing 63. The outer ring 64 of the ball bearing 63 is mounted in a forwardly projecting integral flange 66 formed as a part of the housing 14. A sheet metal ring 65 is mounted between the outer race ring 64 and a shoulder on said forwardly projecting flange 66 to retain a felt washer so as to prevent the escape of lubricant from the interior of the casing or housing 14. This housing 14 is charged with a suitable liquid or semi-liquid lubricant through a filling plug 67. A draining plug 68 is formed in the bottom wall of said housing.

The clutch and pinion cage 55 has a bearing ring 70 preferably formed of bronze secured to the rear end thereof, this bearing ring 70 bearing externally upon a portion of the driven shaft section 51. A driven gear 72 is formed upon the forward end of the driven section 51.

A series of three lay shafts 73 with integral gears 74 and 75 is disposed in the clutch and pinion cage 55 and these lay shafts have their forward ends in suitable bronze bushings 76 supported in the forward wall of the cage member 55, and at their rear ends, these lay shafts and gears have bearings in the bearing ring 70. The bearing ring 70 has openings in line with the square clutch bars 22 so as to permit the rear ends of said clutch bars to lie therein and to assist in holding the two parts, namely, the main cage 55 and the supplemental ring 70 to be held rigidly together. The clutch bars 22 being all connected through the ring 42 to the shifter fork 40 are moved in unison, under the snap action aforesaid.

In the structure shown, the pinion 56 is provided with sixteen teeth; the driven gear 74 is provided with eighteen teeth; the pinion 75 is provided with fifteen teeth and the driven gear 72 with nineteen teeth.

Assuming that the parts are in the position shown and the drive shaft 1 is driven at engine speed, the pinion 56 is always driven at the same rate and since the clutch bars 22 are clutched to the stationary member 11, motion is transmitted from said driving pinion 56 through the three lay shafts 73 with their connected gears and back to the driven pinion 72 and to the propeller shaft 6. In this case, the ratio of engine to propeller shaft speed is as 1.425 is to one.

When it is desired to drive at one to one ratio between the shafts 1 and 6, the lever 27 is pushed forward, clutch bars 22 then being snapped over by the cam hub 46, the rear ends of the bars 22 dropping into the depression 62′ and shortly thereafter dropping into the clutch recesses 60. The depressions 62′ in said clutch flange 59 makes it easier for the ends of the clutch bars to drop into position where they will eventually rest in the clutch recesses and be held against motion in either direction and permits sufficient additional motion to permit the cam hub 46 from the shifter fork 40 to pass by the point of the spring member 33. The same thing is true at the opposite end in regard to the depressed portions 25 of the clutch notches 21 in the member 11. When it is desired to drive at a one to one ratio, the cage 55 with its companion ring 50 and the lay shafts and gears are all clutched to the driven member through the shifter bars 22.

The meshing gears preferably have their teeth inclined with respect to the longitudinal axis, that is, they are slightly helical so as to increase the quietness and strength of the gears and to give the well known herring bone effect. This keeps the shaft sections 50 and 51 in close end to end engagement.

The cross frame member 80 forming a part of the Ford chassis and a brake shaft 81 forming a part of the brake structure, as shown, form no part of my invention and their illustration in the present invention serves only to show that the device of my invention may be installed without conflicting with existing requirements.

In Figure 5, I have shown a transmission of my invention which goes between the driving shaft 82 which is connected to the motor and the driven shaft section 83 which bears a pinion 84 of the usual sliding gear transmission 85. The driving shaft section 82 has a flanged end 86 which is adapted to be connected to the clutch member of the engine. This shaft section 82 is supported in the ball bearings 63 mounted between the races 62 and 64. The inner race 62 is supported upon the shaft section 82 and the outer race 64 is mounted in a wall 87 formed at the junction of the bell housing 88 with the housing 14. Obviously, these two parts may be made separately. The driving shaft section has the clutch flange 89 having the clutch recesses 60, as described in the previous embodiment, that is, preferably six such recesses with partial depressions between pairs to assist in easier meshing of the clutch bars 22 with the sockets 60. At the opposite ends of the housing 14, flange 90 is bolted to the flange 12 of the stationary clutch disc member 91 and to the flange 92 of the main accelerating and reverse transmission 85. The driving shaft section 82 has the driving gear 93 with, for an example, nineteen teeth meshing with the gear 94 on the lay-shaft 95, said gear 94, having, for example, fifteen teeth. The lay-shaft 95 has driving gear 96 with, for example, eighteen teeth meshing with the pinion 97 having, for example, sixteen teeth. The driving shaft section 82 has a central bearing recess 98 into which is piloted the bearing stud 99 of the driven shaft section 83, a suitable bearing liner being introduced between them.

The driven shaft section 83 has a ground bearing portion 100 located within the length of the cage 55 and a suitable bearing liner 101 is positioned in the end of the cage member 55.

The rear end of the driven shaft section 83 is supported in a ball bearing 102 mounted in the forward wall 103 of the transmission 85. The structure of the transmission 85 is otherwise standard, that is, of a type well known in the art and it comprises a driven shaft section 104 axially in line with the shaft section 83 which, for the purposes of the transmission 85, is a driving shaft section. There are two shiftable gears 105 and 106 mounted on the splined central part of the shaft section 104, the rear end of said shaft section being supported in suitable ball bearings 107 mounted in the rear wall 108 of the case 109. The forward shiftable gear 106 has a clutch socket 110 cooperating with clutch teeth 111 from a rear end of the pinion 84. The forward end of the shaft section 104 is piloted in a bearing in the adjacent part of the shaft section 83, as indicated at 112. The housing 109 contains a lay-shaft 113 upon which is a tubular gear structure comprising the low speed gear 115 meshing with the pinion 84 and companion gear 116 adapted to mesh with the gear 105 for driving the shaft section 104 at low speed. The compound gear member 114 also bears the gear 117 which cooperates with the sliding gear 110 for intermediate speed. It also bears the reverse driving pinion 118 which, operating through an idler, drives the sliding gear 105 for reverse direction of motion of the shaft section 104. For direct drive, the shiftable gear 106 is moved forward to clutch the shaft sections 83 and 104 together directly. The shiftable gears are suitably controlled by manually operable shifter handle or lever 120 pivoted in a ball or spherical joint 121 in the housing 122 which is formed on the cover of the main housing 109.

The operation of a structure is believed to be apparent from the aforesaid description. Normally, the drive is from the shaft 82 which is connected to the motor through the first transmission which is clutched for direct drive, the clutch bars 22 being shifted to the right, as viewed in Figure 5, and the drive proceeding through the transmission 85 in the well known manner, that is, either through the accelerating and reverse gears or through direct drive to the rear axle. When it is desired to change the driving ratio between the engine and the propeller shaft to drive the propeller shaft at a higher range of speed, that is at a higher rate, the shifter handle 22 is thrown to the front or right, as indicated in Figure 5, so that the drive proceeds through the gears, the cage 55 and its connecting bearing ring 70 being held stationary. The gears on the three lay-shafts and on the driving and driven sections may be made with inclined teeth to secure quietness and strength, as explained in connection with the first embodiment. The advantage of placing the drive of my invention in advance of the usual accelerating and reverse gear transmission is that the transmission of my invention is thereby subjected to no more than engine torque and hence may be made small and compact. Due to the use of three lay-shafts and the fact that the gears are all in constant mesh, the transmission is surprisingly quiet and, in fact, during normal operation can not be heard. The structure is inexpensive and due to the smallness of the parts may readily be manufactured and is easily installed.

In the embodiment of Figure 1, the transmission is shown as a reduction, it being assumed that the gear ratio at the rear axle is too high for the ordinary ranges of speeds and the ratio is proper for higher speed.

Quite obviously, the ratio may be reversed if it is desired to drive at a higher speed when the gears of my invention are in operation. That is one of the features of the present invention which is of importance, namely, that with very small changes in structures, either an underdrive or an overdrive may readily be secured. All that is required is to change the pinions on the driving and driven sections and then the lay-shaft may be reversed, if desired, or at the most, the lay-shaft with its gears may be modified accordingly.

I do not intend to be limited to the details shown or described, nor to the specific location of the transmission of my invention.

I claim:—

1. In combination, a housing having an integral end wall, a bearing in said end wall, a removable end wall for the open end of the housing, a bearing in said second end wall, a pair of shaft sections mounted in said bearings and piloted axially in alignment with each other, a cage surrounding the ends of said shaft sections and having bearings thereupon, pinions of different diameters on the adjacent ends of the shaft sections, a series of lay-shafts having connected gears meshing with said pinions, a series of clutch bars disposed in the cage substantially parallel with said lay-shaft, a collar for shifting said clutch bars, means for clutching said bars at one end to the housing and means for clutching said bars at the opposite end to one of said shaft sections.

2. In combination, a housing having an end wall, a bearing in said end wall, a removable plate for the other end of the housing, said plate having a bearing and a series of clutch jaws, a driving shaft section in one of said bearings, a driven shaft section in the other bearing, said shaft sections having a pilot bearing for holding them in alignment, pinions on the adjacent ends of the shaft sections, a cage having bearings on the shaft sections, said cage being split, a series of lay-shafts having integral pinions meshing with the aforesaid pinions, said lay-shafts being mounted in said cage, one of said shaft sections having a plurality of clutch jaws, and shiftable clutch means mounted on the cage for selectively clutching either set of jaws.

3. In combination, a cage member having a central bearing and a series of bearings surrounding the same, an end plate for the cage having a central bearing and a series of bearings surrounding the same, a plurality of lay-shafts having connected gears, said shafts being disposed in the outer bearings of the cage and of the end plate, said cage and end plate having a series of longitudinal openings therethrough, and clutch bars disposed in said longitudinal openings, said clutch bars having clutching shoulders at each end.

4. In combination, a cage member having a central bearing and a series of bearings surrounding the same, an end plate for the cage having a central bearing and a series of bearings surrounding the same, a plurality of lay-shafts having connected gears, said shafts being disposed in the outer bearings of the cage and of the end plate, said cage and end plate having a series of longitudinal openings therethrough, clutch bars disposed in said longitudinal openings and a clutch collar having a series of fingers connected to said clutch bars.

5. In combination, a driving element, a driven element, gearing for connecting the elements, a cage associated with the gearing and the elements, a relatively fixed member, means comprising rods slidably mounted in the cage and being capable of being projected out of either end of the cage for clutching one end of said cage to said member and means for clutching the other end of said cage to one of said two elements.

6. In combination, a first shaft, a second shaft, a relatively stationary clutch member, a clutch member connected to one of said shafts, pinions on the shafts, a gear cage associated with the pinions, pinions journaled in the cage and meshing with said other pinions, and slidable clutch elements carried by the cage and adapted to project from either end of the cage to engage one of the clutch members.

7. In a transmission, the combination of a pair of shafts having sun gears, a cage embracing the gears, connected planet pinions journaled in the cage and meshing with the sun gears, a frame having a stationary clutch plate adjacent one end of the cage, a clutch plate on one of the shafts at the other end of the cage, said clutch plates having clutch shoulders, clutch rods carried in the cage, said rods having shoulders at opposite ends of the cage for selectively engaging the clutch shoulders of the clutch plates, and a shifter ring lying peripherally outside the rods and connected thereto.

8. In combination, a drive shaft having a sun pinion on its inner end, a driven member comprising a sun gear of larger diameter than the sun pinion, a cylindrical bearing portion on said driven member adjacent the sun gear, said driving shaft being piloted into the driven member, a cage having an integral end portion, a bearing for the shaft in said end portion, said sun pinion being of larger diameter than the shaft, said cage having another end portion bearing upon said cylindrical bearing portion on the driven member, a planet gear and a connected planet pinion journalled in the cage and meshing with said sun pinion and sun gear respectively, the driven member having an integral clutch plate adjacent to the cylindrical bearing portion, a stationary clutch plate at the other end of the cage, and clutch bars carried in the cage and projectible from the opposite ends thereof selectively into engagement with said first or said second clutch plate.

In witness whereof, I hereunto subscribe my name this 7th day of December, 1925.

THOMAS L. FAWICK.